United States Patent
Wolleschensky et al.

(10) Patent No.: US 7,633,053 B2
(45) Date of Patent: Dec. 15, 2009

(54) MICROSCOPE, PARTICULARLY A LASER SCANNING MICROSCOPE WITH ADAPTIVE OPTICAL ARRANGEMENT

(75) Inventors: Ralf Wolleschensky, Schoeten (DE); Michael Kempe, Kunitz (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 0 days.

(21) Appl. No.: 10/461,234

(22) Filed: Jun. 13, 2003

(65) Prior Publication Data
US 2003/0230710 A1    Dec. 18, 2003

(30) Foreign Application Priority Data
Jun. 15, 2002    (DE)    ................................. 102 27 120

(51) Int. Cl.
*H01J 3/14*    (2006.01)
*G02B 7/04*    (2006.01)
*G02B 17/00*    (2006.01)
(52) U.S. Cl. .................. 250/234; 250/201.3; 359/726
(58) Field of Classification Search .............. 250/201.3, 250/234, 225, 239, 340, 201.9, 201.2, 201.4, 250/559.06, 559.09; 359/618, 631, 389, 359/385, 368, 208, 290–291, 726–731, 854–859, 359/862–865, 872, 877, 486, 629; 356/150, 356/318, 322, 327, 399, 497, 487
See application file for complete search history.

(56) References Cited

U.S. PATENT DOCUMENTS 4,905,311 A * 2/1990 Hino et al. .................. 250/225
5,155,550 A * 10/1992 Barger ........................ 356/487
5,383,053 A * 1/1995 Hegg et al. .................. 359/486
6,252,222 B1 * 6/2001 Kasapi et al. ........... 250/214 R
6,631,226 B1 * 10/2003 Schoeppe et al. ............. 385/33
6,751,016 B2 * 6/2004 Fukuyama et al. .......... 359/368
6,888,680 B2 * 5/2005 Wolleschensky ............ 359/629
7,151,632 B2 * 12/2006 Biss et al. .................... 359/371
2002/0154398 A1 * 10/2002 Wolleschensky et al. .... 359/385
2003/0030923 A1 * 2/2003 Hsu et al. .................... 359/857

FOREIGN PATENT DOCUMENTS
WO    WO 00/17612    3/2000

* cited by examiner

*Primary Examiner*—Georgia Y Epps
*Assistant Examiner*—Don Williams
(74) *Attorney, Agent, or Firm*—Reed Smith LLP (57) ABSTRACT

A microscope, particularly a laser scanning microscope, with an adaptive optical device in the microscope beam path, comprising two reflective adaptive elements, at least one of which is constructed as an adaptive optical element, both of which are oriented with their reflector surface vertical to the optical axes of the microscope beam path, and a polarizing beam splitter whose splitter layer is located in the vertex of two orthogonal arms of the microscope beam path or two orthogonal portions of a folded microscope beam path, wherein a first adaptive element is associated with one arm and the other adaptive element is associated with the second arm, and a quarter-wave plate is located in each arm between the beam splitter and reflective adaptive element, and a detection device to which the detection light is directed and which is linked to the adaptive elements by evaluating and adjusting devices.

18 Claims, 6 Drawing Sheets

FIG. A
STATE OF THE ART

MICROSCOPE, PARTICULARLY A LASER SCANNING MICROSCOPE WITH ADAPTIVE OPTICAL ARRANGEMENT

CROSS-REFERENCE TO RELATED APPLICATION

This application claims priority of German Application No. 102 27 120.8, filed Jun. 15, 2002, the complete disclosure of which is hereby incorporated by reference.

BACKGROUND OF THE INVENTION a) Field of the Invention

The invention is directed to a microscope, particularly a laser scanning microscope, with an adaptive optical device for variable adaptation of the illumination beam path and/or detection beam path to the characteristics of the optical component groups and/or to the characteristics of the sample.

b) Description of the Related Art

The use of adaptive optics in microscopes is already known, per se, in the prior art and is described, for example, in PCT/WO99/06656. However, the use of the adaptive optics in the illumination beam path and/or detection beam path as is disclosed therein requires the use of at least one beam splitter which must be incorporated in the design resulting in optical losses.

Coupling adaptive elements into the beam path without losses by means of mirrors as is shown in principle in the accompanying drawing labeled "prior art" is also known, but leads to additional substantial aberrations due to the oblique incidence of the beam path on the reflector faces.

Further, the prior art requires interaction between the adaptive optical elements and a wavefront sensor, so that further losses occur in general.

Formerly conventional sensors such as Shack-Hartmann sensors or interferometers are used as wavefront sensors in this connection as is indicated, for example, in PCT/GB99/03194. However, sensors of this kind are not well suited to three-dimensional scanning of a sample as is intended with a confocal laser scanning microscope. This is due to the fact that, in contrast to confocal detection, a relatively large amount of unfocused light strikes the sensor.

OBJECT AND SUMMARY OF THE INVENTION

Proceeding from this prior art, the invention has the primary object of further developing a microscope of the type mentioned in the beginning in such a way that a loss-free and aberration-free coupling of the adaptive optics into the illumination beam path and/or detection beam path is ensured. Another object of the invention is to realize a suitable regulation of the adaptive optics without the use of special wavefront sensors.

According to the invention, the adaptive optical device comprises
two reflective adaptive elements, both of which are oriented with their reflector surface vertical to the optical axis of the microscope beam path, and a polarizing beam splitter whose splitter layer is located in the vertex of two orthogonal branches or arms of the microscope beam path, wherein a first adaptive element is associated with one arm and the other adaptive element is associated with the second arm, and a quarter-wave plate is located in each of the arms between the beam splitter and adaptive element, and a detection device to which the detection light is directed and which is linked to the adaptive element by evaluating and adjusting devices.

The detection device which exists in the laser scanning microscope anyway should preferably be used as detection device.

Depending on the evaluation and processing of the detector signals, it is possible with this arrangement to achieve fast depth scanning in the three-dimensional scanning of a sample without a displacing movement of the microscope objective or the sample, to compensate for aberrations caused by the sample and also to correct aberrations caused by incorrectly used or incompletely corrected optical components, particularly the microscope objective.

In a construction of the invention, a polarizing beam splitter is used and a quarter-wave plate is located in each of the arms between the beam splitter and adaptive element. In this arrangement, the light coming from the illumination source is directed in the one arm through the splitter layer and a quarter-wave plate to the first adaptive element depending on its polarization state, is reflected back from the reflector surface of the adaptive element to the splitter layer and is propagated in the direction of the microscope objective. The light is deflected in the direction of the other arm with orthogonal polarization with respect to the light propagating in the direction of the first adaptive element, a second adaptive element being located at the end of the other arm. The light is reflected back at this element after passing through a quarter-wave plate to the splitter layer and passes through the latter to the microscope objective.

The detection light radiated from the sample and coming through the microscope objective passes through one arm or the other arm depending on its polarization state, is reflected back to the splitter layer by the corresponding reflective adaptive element and propagates toward the detection device.

The detection device has a second polarizing beam splitter and two optoelectronic converters. Depending on its polarization state, the detection light passes through the splitter layer of this beam splitter to the one optoelectronic converter or is deflected by the splitter layer to the other optoelectronic converter. The signal from the converters can be uniquely correlated to the light traveling on the detection side via a determined arm of the beam splitter arrangement with the adaptive elements.

The essential advantage of this arrangement consists in that it makes it possible to couple the adaptive optics into the illumination beam path and/or detection beam path of the microscope without losses or aberrations. Further, there are different advantageous modes of regulation of the adaptive optics as will be explained more fully in the following. The arrangement according to the invention can be used in a point-scanning laser scanning microscope or in a line-scanning laser scanning microscope.

Pinhole optics for focusing the detection light on a pinhole and optics for collimating the detection light are provided between the beam splitter associated with the adaptive elements and the detection device, corresponding to the construction of a confocal laser scanning microscope.

The object of the invention is also met by an adaptive optical device which comprises the following:
an adaptive reflective element and a nonadaptive reflective element, both of which are oriented with their reflector surface vertical to the optical axis of the microscope beam path, and a polarizing beam splitter whose splitter layer is located in the vertex of two orthogonal arms of the microscope beam path, wherein the adaptive element is associated with one arm and the nonadaptive element is associated with the second arm, and a quarter-wave plate is located in each arm between the beam splitter and the respective reflective element, and a detection device to which the detection light is directed and which is linked to the adaptive element via an evaluating and adjusting device.

The existing detection device of the laser scanning microscope should preferably be used as detection device.

An arrangement can be provided in which the light coming from the illumination source is directed in one arm through the splitter layer and a quarter-wave plate to the adaptive element depending on its polarization state, is reflected back to the splitter layer by the reflector surface of the adaptive element and is propagated in the direction of the microscope objective.

The light with orthogonal polarization with respect to the light propagating in the direction of the first adaptive element is guided in the direction of the other arm, a nonadaptive element (a mirror) being located at the end of the other arm. At this mirror, the light is reflected back to the splitter layer after passing through a quarter-wave plate and passes through the splitter layer to the microscope objective.

In this construction, it is possible to do without the adaptive element on the excitation side by suitable polarization of the light and to obtain uncorrected imaging in combination with the detection of the signal from the nonadaptive element or to switch quickly between corrected and uncorrected imaging by rotating the polarization.

In both of the constructions mentioned above, the adaptive device can be provided in the excitation beam path and detection beam path as is described in the first arrangement or only in the excitation beam path. The latter is particularly suitable for use in connection with multiphoton excitation, wherein the adaptive optical device is placed on the excitation side prior to the separation of the illumination beam path and detection beam path.

The adaptive elements are preferably positioned in a pupil plane of the microscope beam path.

The pupil plane is advantageously identical to the reflecting surfaces of the scanning device and the scanning optics, the microscope objective and a tube lens are positioned relative to one another in such a way that a diffraction-limited spot is generated in the sample, which spot is guided over the sample in lateral direction due to the scanning movement. As has already been stated, point scanning or line scanning can be carried out.

For example, mirrors with mirror surfaces that are adjustable in segments, diaphragm mirrors or reflective spatial light modulators can be used as adaptive reflective elements.

Another preferred construction of the arrangement according to the invention consists in that zoom optics are associated with the adaptive elements and serve to adapt the aperture of the respective adaptive element to the aperture of the microscope objective.

Another alternative constructional variant comprises:

an adaptive concave mirror which is arranged in a pupil plane of the illumination beam path, an optical beam splitter being associated with the adaptive concave mirror in an intermediate image plane and having a transmittive area and a reflective area in a splitter surface, wherein the illumination light is directed initially to the splitter surface and from the reflective area of the latter to the concave mirror, is focused by the concave mirror onto the transmittive area and passes through the latter to the sample and/or an adaptive concave mirror which is arranged in a pupil plane of the detection beam path, an optical beam splitter being associated with the adaptive concave mirror in an intermediate image plane and having a transmittive area and a reflective area in a splitter surface, wherein the detection light is directed initially to the splitter surface and from its reflective area to the concave mirror, is focused by the concave mirror onto the transmittive area and passes through the latter to a detection device, and an evaluating device which is connected on the input side to the detection device of the microscope and on the output side to adjusting devices for varying the shape of one or both concave mirrors and/or for changing the distance between the respective concave mirror and the associated beam splitter.

With this arrangement, the adaptive concave mirror in the illumination beam path can again be used for fast focusing or for correcting image errors which are caused by the optical component groups or by the sample to be examined. The transmittive area of the splitter surface does not act as a confocal diaphragm or spatial filter, and it has a diameter at least greater than 5 Airys.

The detection light coming from the sample is branched off from the illumination beam path by a beam splitter which is provided for this purpose and which is preferably positioned between collimating optics for the illumination light and the scanning device.

When a point-scanning device is provided for scanning the sample, the transmittive area of the splitter surface is formed as a circular or elliptical opening. The elliptically shaped opening is advantageous in that there is a circular projection in the direction of the concave mirror when the splitter surface is inclined by 45° relative to the incident radiation.

In case of a line-scanning device for scanning the sample, the transmittive area of the splitter surface is formed as a slit-shaped opening.

Further, it can be advantageous when the illumination light and/or the detection light which pass(es) through the transmittive area of the associated splitter surface are/is followed by a detector on which the beam component falling through impinges and which serves for evaluating the beam intensity of this light.

All of the adaptive concave mirrors provided in the arrangement according to the invention can also be coupled with a device for displacing them in the direction of the optical axis, wherein this displacement device likewise communicates with the evaluating and adjusting device, and wherein the displacement of the adaptive concave mirror and the adjustment of its focal length influence the focusing in that the geometry of the mirror surface is changed by corresponding control. Among other things, the aperture of the concave mirror is adapted to the pupils of the used microscope objectives in this way.

Apart from the almost loss-free and aberration-free coupling of the adaptive element into the microscope beam path, the particular advantage of the latter design consists in the ideal chromatic correction by dispensing with refractive elements.

The reflective adaptive elements mentioned above can be used as adaptive concave mirrors.

Further, refractive elements can also be associated with the adaptive concave mirrors for reducing their focal lengths.

In addition, a device can be provided which makes it possible to swivel a wavelength filter into the detection beam path in order to suppress the illumination light, particularly with fluorescence detection.

Further, relay optics can also be arranged in the beam path and can be used to generate a pupil at the location of an adaptive concave mirror.

The invention will be explained more fully in the following with reference to embodiment examples.

BRIEF DESCRIPTION OF THE DRAWINGS

In the drawings.

FIG. A shows the state of the art in schematic form.

DESCRIPTION OF THE PREFERRED EMBODIMENTS

Figure 1:
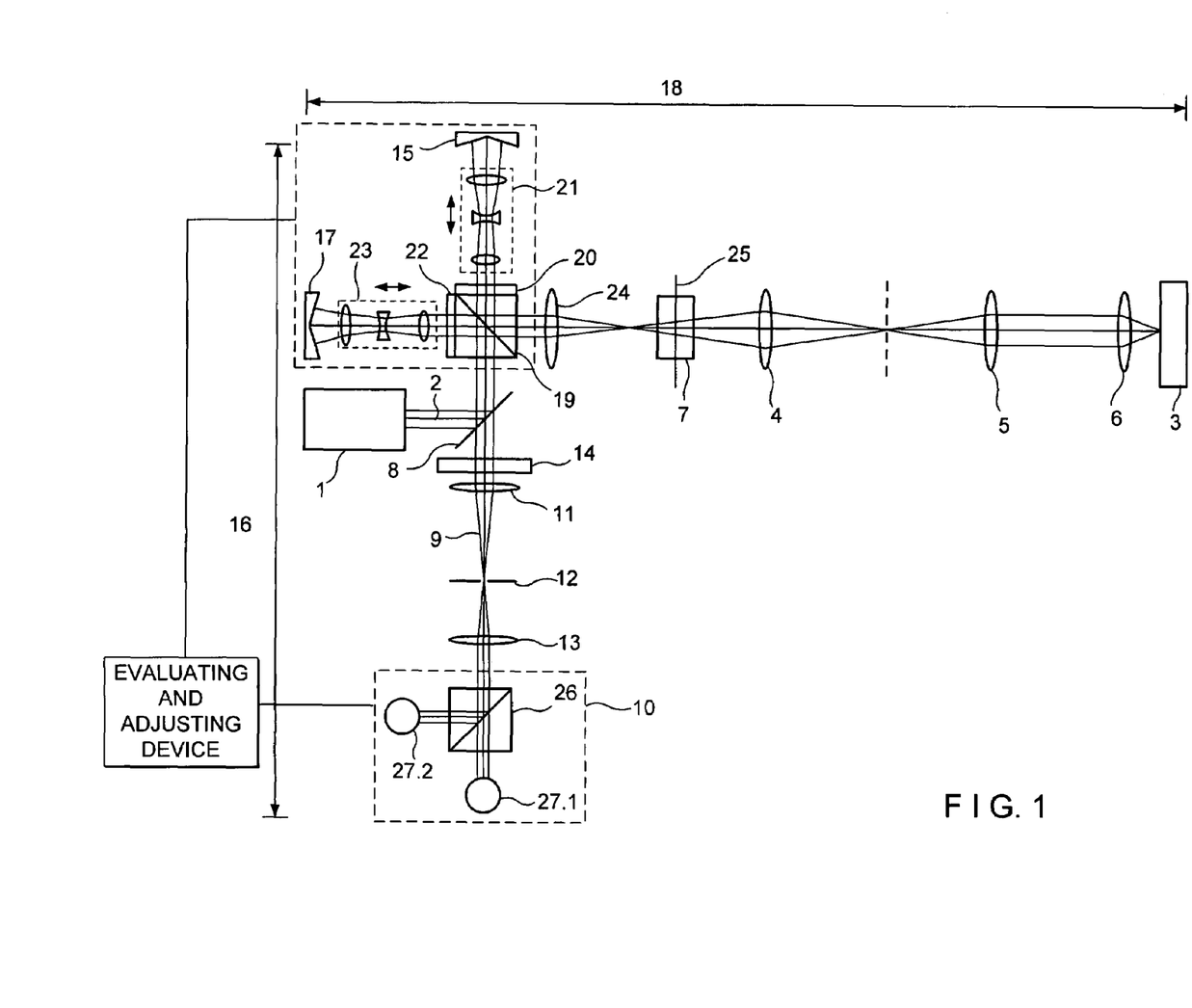
FIG. 1 shows the beam path of a confocal laser scanning microscope with an adaptive optical device, according to the invention, comprising two adaptive mirrors.

In FIG. 1 the arrangement according to the invention is illustrated with reference to a beam path of a confocal laser scanning microscope in which the illumination light 2 proceeding from an illumination source 1 is directed to a sample 3. In so doing, a diffraction-limited spot is generated by scanning optics 4, a tube lens 5 and the microscope objective 6, this spot being moved over the sample 3 in lateral direction by means of a scanning device 7 for obtaining images.

The light emitted by the sample 3 passes through the microscope objective 6, tube lens 5 and scanning optics 4 in the opposite direction and is directed to a detection device 10 via a beam splitter 8 which serves to divide the detection beam path 9 and the illumination light 2. Pinhole optics 11, a pinhole 12 and collimating optics 13 are arranged following the beam splitter 8 in the detection beam path 9.

Further, a wavelength filter 14 which prevents illumination light 2 from reaching the detection device 10 particularly in fluorescence detection is provided.

According to the invention, there is a first adaptive mirror 15 whose reflector surface is oriented vertical to the optical axis of an arm 16 of the microscope beam path. Further, another adaptive mirror 17 is oriented with its reflector surface vertical to the optical axis of an arm 18 of the microscope beam path.

A polarizing beam splitter 19 whose splitter layer is inclined by 45° relative to the beam direction in both arms 16, 18 is arranged in the vertex of the angle enclosing the two arms 16 and 18.

Further, a quarter-wave plate 20 and zoom optics 21 are provided between the beam splitter 19 and the adaptive mirror 15, and a quarter-wave plate 22 and zoom optics 23 are provided between the beam splitter 19 and the adaptive mirror 17.

Finally, a lens 24 whose purpose is to image the planes of the adaptive mirrors 15 and 17 in a pupil plane 25 of the microscope arrangement is provided. However, this function can also be taken over simultaneously by the zoom optics 21 or 23 when suitably designed, in which case the lens 24 is dispensed with.

During the scanning of the sample 3, after the illumination light 2 is deflected in beam splitter 8, depending on its polarization state, it passes through the splitter layer of beam splitter 19 to the adaptive mirror 15 or, deflected by the splitter film, to the adaptive mirror 17 or also to both adaptive mirrors 15, 17.

The light is reflected back again to the beam splitter 19 by the adaptive mirror 15 or 17 on which it impinges. The illumination light which travels back to the beam splitter 19 after passing twice through the quarter-wave plate 20 or 22 is polarized orthogonal to the incident light. Consequently, the illumination light is coupled into the microscope beam path again by way of the splitter layer of the beam splitter 19 and is then directed to the sample 3.

This in-coupling is carried out without losses due to the adaptive device according to the invention which comprises the adaptive mirrors 15, 17, the polarizing beam splitter 19 and the quarter-wave plate 20, 22.

The light emitted by the sample 3 traverses the light path in the reverse sequence via the beam splitter 19 and adaptive mirrors 15, 17. Then, depending on its polarization state, the detection light is either deflected by the splitter layer of the beam splitter 19 to the adaptive mirror 15 or travels through the splitter layer of the beam splitter 19 to the adaptive mirror 17 or to both adaptive mirrors 15, 17. The detection light is also thrown back again by the adaptive mirrors 15, 17 and is polarized orthogonal to the arriving detection light after passing twice through the quarter-wave plates 20 and 22. This means that the light coming to the adaptive mirror 15 and reaching the detection device 10 is polarized orthogonal to the light coming from adaptive mirror 17.

On this basis, a polarizing beam splitter 26 and two optoelectronic converters 27.1, 27.2 are provided in the detection device 10.

Accordingly, it is possible to detect the detection light coming from adaptive mirror 15 by means of the optoelectronic converter 27.1 and to detect the detection light coming from adaptive mirror 17 by means of optoelectronic converter 27.2; that is, signals which are separately associated with the adaptive mirrors 15 and 17, respectively, on the detection side are applied to the outputs of the optoelectronic converter 27.1, 27.2.

According to the invention, it is further provided that the output signal of the optoelectronic converter 27.1 communicates with the adaptive mirror 15 via an evaluating and adjusting device, and the output of the optoelectronic converter 27.2 likewise communicates with the adaptive mirror 17 by means of an evaluating and adjusting device.

Further, the zoom devices 21 and 23 are also coupled with the respective associated evaluating and adjusting device.

With the arrangement according to the invention, it is possible to use the adaptive optics for fast focusing or for correcting image errors caused by the optical component groups or by the sample to be examined with high efficiency and with relatively small expenditure on apparatus. The corresponding methods are described further below.

In the following, another embodiment example will be described with reference to FIG. 2. The illumination light 29 proceeding from an illumination source 28 is again directed by means of scanning optics 30, a tube lens 31 and the microscope objective 32 to a sample 33. A diffraction-limited spot is guided over the sample 33 in lateral direction by means of a scanning device 34 and image information of the sample 33 is obtained in this way.

The light radiated by the sample 33 traverses the microscope objective 32 and the tube lens 31 in the reverse direction, is split from the illumination beam path by means of a beam splitter 35 and is then directed to a detector 38 by pinhole optics 37 as a separate detection beam path 36.

According to the invention, an adaptive mirror 39 and a conventional, nonadaptive mirror 40 are provided in the beam path of the illumination light 29 between the illumination source 28 and the scanning device 34 and are oriented with their reflector surfaces vertical to two arms 41, 42 of the illumination beam path. The two arms 41, 42 enclose a right angle in whose vertex the splitter surface of a polarizing beam splitter 43 is located. The splitter surface is inclined by 45° to the beam direction in the two arms 41, 42.

Further, a quarter-wave plate 44 is arranged in the beam path between the beam splitter 4 and the mirror 40, and a quarter-wave plate 45 and zoom optics 46 are arranged in the beam path between the adaptive mirror 39 and the beam splitter 43.

When this microscope arrangement is operated, the illumination light 29 passes through the splitter surface of the beam splitter 43 via the quarter-wave plate 45 and the zoom optics 46 to the adaptive mirror 39 depending on its polarization state in a manner analogous to the preceding embodiment example, and is reflected back by the adaptive mirror 39 over the same path to the splitter surface of the beam splitter 43. A deflection takes place from the splitter surface toward the sample 33, since the illumination light 29 is now polarized orthogonal to the incident illumination light 29 after passing twice through the quarter-wave plate 45.

When the polarization diverges, the illumination light 29 is initially deflected by the splitter layer of the beam splitter 43 toward the mirror 40 and is reflected back from the latter to the splitter layer, passes through the quarter-wave plate 44 twice and, after passing through the quarter-wave plate 44 twice, has a polarization direction orthogonal to the incident illumination light 29, as a result of which the illumination light now passes through the splitter layer to the sample 33.

The light radiated from the sample 33 reaches the detector 38 along the path described above, the detector 38 communicates with the adaptive mirror 39 and/or the zoom device 46 via an evaluating and adjusting device, not shown. The procedure when this arrangement is used for image generation will be explained more exactly below.

The actuating signals which are generated in the evaluating device for the zoom optics 46 can serve to adapt the beam expansion to the microscope objective in an optimal manner.

Figures 3A, 3B:
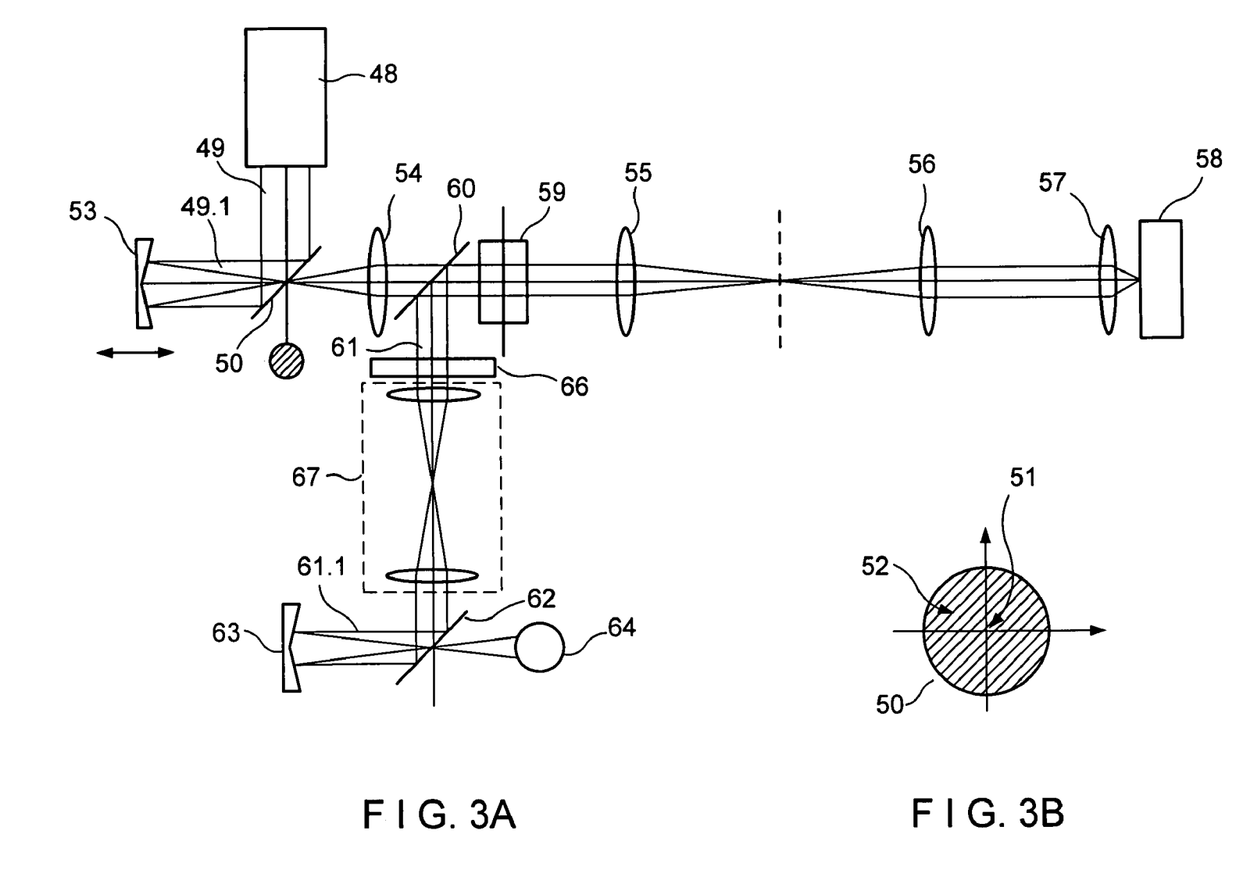
FIGS. 3a and 3b show a schematic view of another embodiment example of the arrangement, according to the invention, with a beam splitter which has a reflective area and a transmittive area.

FIG. 3a shows a schematic view of another embodiment example of the arrangement according to the invention. In this case, the illumination light 49 proceeding from an illumination source 48 strikes the splitter surface 50 of an optical beam splitter.

It can be seen in FIG. 3b that the splitter surface 50 has a transmittive area 51 formed as a circular opening which is enclosed by a reflective area 52. Alternatively, the transmittive area 51 can also be formed as an elliptical opening. As is further shown in FIG. 3a, the splitter surface 50 is inclined by 45° relative to the incident illumination light 49. In this way, the beam component 49.1 of the illumination light 49 striking the reflective area 52 is deflected to an adaptive concave mirror 53 which is located in a pupil plane of the microscope arrangement.

The adaptive concave mirror 53 focuses the beam component 49.1 in itself back to the transmittive area 51 located in an intermediate image plane of the arrangement and accordingly acts as a confocal diaphragm in the illumination beam path.

In this connection, it is possible to influence or adjust the optical resolution of the microscope arrangement through the use of splitter surfaces with transmittive areas of different diameter.

When the transmittive area 51 has an elliptical shape, this shape takes on an apparently circular shape because of the 45-degree inclination of the splitter surface 50 for the radiation coming from the concave mirror 53.

The beam component 49.1 focused on the transmittive area 51 passes through the transmittive area 51 and is subsequently collimated through a lens 54. A diffraction-limited spot serving for recording images of the sample 58 is generated in the sample 58 by means of scanning optics 55, a tube lens 56 and the microscope objective 57 and is moved for this purpose in lateral direction over the sample 58 by means of a scanning device 59.

The detection light proceeding from the sample 58 and carrying along the image information passes on its return path through the microscope objective 57, tube lens 56, scanning optics 55 and scanning device 59 to a dichroic beam splitter 60 which separates the detection beam path 61 from the illumination beam path and directs it to the splitter surface 62 of another beam splitter.

Splitter surface 62 is constructed identical to splitter surface 50 with respect to geometry and orientation to the detector beam path 61.

Since, consequently, the splitter surface 62 likewise has a reflective area 52 (see FIG. 3b), a predominant proportion 61.1 of the detection light is directed to an adaptive concave mirror 63. The concave mirror 63 focuses the beam portion 61.1 in itself back to the transmittive area 51 and through the latter, whereupon the detection light strikes a detector 64.

The intensity of the detection light is measured by means of the detector 64 and the measured value is conveyed to an evaluating device, not shown in the drawing, which communicates with adjusting devices for changing the geometry of the mirror surfaces of the adaptive concave mirrors 53 and 63.

The reflective wavefront in one or both concave mirrors 53, 63 is influenced in such a way when the mirror geometry is adjusted that an optimal correction of aberrations is achieved and a determined defocusing is adjusted.

In another construction of this embodiment example, another detector 65, for example, a monitor diode, can be arranged following the splitter surface 50 in the direction of the illumination light 49 and can be used to monitor the average output of the illumination light.

The quantity of the coupled-out light is given by the function:

$$T = \frac{A_{HT}}{A_{pupil}} = \frac{r_{HT}^2}{r_{pupil}^2}$$

where T is the transmission, $A_{HT}$ is the surface of the transmittive area, $A_{pupil}$ is the effective pupil cross section, $r_{HT}$ is the radius of the transmittive area and $r_{pupil}$ is the radius of the pupil, where advantageously T~1%. The radius of the reflective area is advantageously about 5 mm, the radius of the transmittive area (viewed in the direction of projection or in the direction of radiation) is less than 0.25 mm.

A wavelength filter 66 which can be swiveled into the detection beam path 61 can be provided optionally so that the illumination light does not reach the detector 64, particularly in fluorescence detection.

Further, it has proven advantageous to arrange relay optics 67 in the detection beam path 61, which relay optics 67 are used for generating a pupil at the location of the adaptive concave mirror 63. They can be constructed at the same time as zoom optics and enable a variable beam expansion. The splitter surface 62 is located in an intermediate image plane of the microscope arrangement and acts as a confocal diaphragm in the detection beam path 61.

When the diameter of the beam impinging on the splitter surface 62 or the diameter of the transmittive area 51 of the splitter surface 62 changes or splitter surfaces with transmittive areas of different diameter are exchanged for one another, the optical resolution of the microscope arrangement can be influenced or adjusted in this way.

The portion of illumination light or detection light impinging on the transmittive area 51 is lost at the splitter surfaces 50 and 62 when not in focus. However, the ratio of the surface of the transmittive area 51 to the surface of the reflective area 52 is:

$$R = \frac{A_{pupil} - A_{HT}}{A_{pupil}} = \frac{r_{pupil}^2 - r_{HT}^2}{r_{pupil}^2}$$

where $A_{pupil}$ is the effective pupil cross section, $A_{HT}$ is the surface of the transmittive area 51, $r_{pupil}$ is the radius of the pupil, $r_{HT}$ is the radius of the transmittive area 51. The radius for the reflective area 52 for a microscope arrangement is typically about 5 mm, while the radius of the transmittive area 51 is less than 0.25 mm.

As a result, the surface ratio and therefore the efficiency of the beam splitting in the two splitter surfaces 50 and 62 is given by R>99%. The efficiency achieved in this way is not dependent upon the respective wavelength of light.

The operation of the arrangement according to the invention will be explained in the following for different operating modes of a confocal laser scanning microscope. Only the embodiment example according to FIG. 1 is used for this description. The arrangements according to the rest of the embodiment examples can be applied in an analogous sense.

Reflection Microscopy

In this type of operation, the light that is scattered or reflected by the sample 3 is used for image generation.

In cases where the sample 3 does not have a birefringent action or does not have a pronounced reflectivity dependent upon polarization, the following procedure can be taken. The polarization of the illumination light is oriented in such a way that light of the same intensity strikes adaptive mirrors 15 and 17. In the detection beam path 9, the light reflected by the sample strikes the adaptive mirrors 15 and 17 again when passing the two arms 16 and 18, wherein the light striking the converter 27.1 has been reflected by the adaptive mirror 15 on the excitation side as well as on the detection side, and the light reaching the converter 27.2 has been reflected by the adaptive mirror 17 on the excitation side as well as on the detection side.

As a result of aberrations caused by defocusing, by the sample or by optical elements, a light intensity recorded at the detectors in the confocal arrangement is less than that recorded with aberration-free imaging. The reception signal can be evaluated with respect to a specific point on the sample or as an average value over a given scanning surface on the sample. When the geometries of the mirror surfaces of the adaptive mirrors 15 and 17 are changed and the effects on the reception signal are measured, a mirror geometry with which there is an optimal reception signal and with which the optical system is therefore corrected with respect to aberrations can be found and adjusted depending on the measurement results.

In a preferred mode of operation, the geometric shape of the mirror surface of the adaptive mirrors 15 and 17 is varied using Zernike polynomials. For this purpose, the development coefficients $(z_1, z_2, \ldots z_i \ldots z_N)$ determine the shape of the mirror surface uniquely. In the present arrangement, the gradient of the intensity of the reception signal with respect to a Zernike coefficient $\partial I/\partial z_i \approx \Delta I/\Delta z_i$ can be obtained by one measurement in that a mirror shape $(z_i, z_2, \ldots z_i + \Delta z_i \ldots z_N)$ is adjusted in the adaptive mirror 15 and a mirror shape $(z_1, z_2, \ldots z_i \ldots z_N)$ is adjusted with adaptive mirror 17.

The standardized gradient is given by $grad_i = (I_i^{Del1} - I_i^{Del2})/\Delta z_i * 2/(I_i^{Del1} + I_i^{Del2})$, where $I_i^{Del1}$ and $I_i^{Del2}$ are the intensity values measured by the optoelectronic converters 27.1 and 27.2.

This measurement is carried out for all relevant coefficients. The new mirror shape is given by the gradient from $(z_1', z_2', \ldots z_N') = (z_1 + (\Delta z_1)^2 grad_1, z_2 + (\Delta z_2)^2 grad_2, \ldots z_N + (\Delta z_N)^2 grad_N))$, i.e., every new coefficient is given as $z_i' = z_i + (\Delta z_i)^2 grad_i$.

Figure 4:
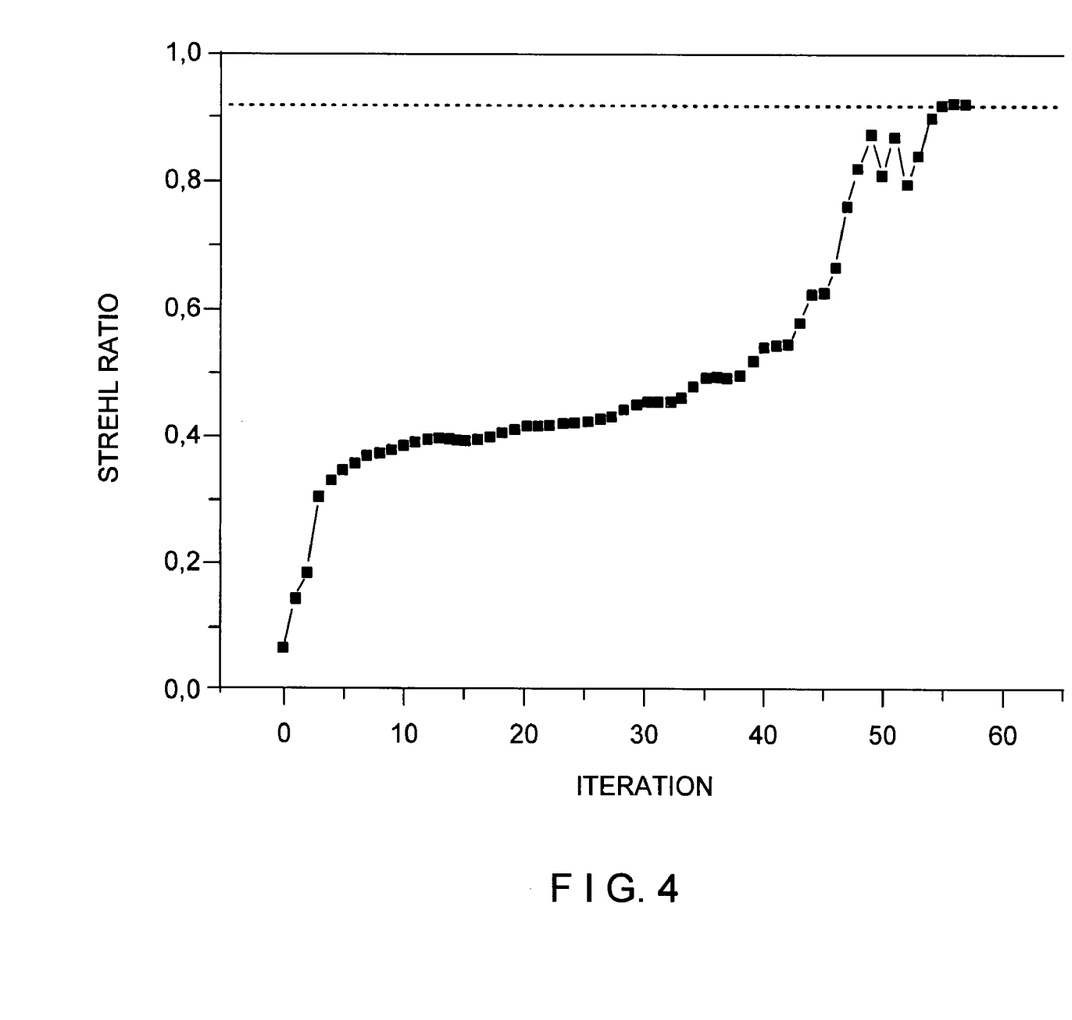
FIG. 4 shows measurement values obtained by iteration during the imaging of a biological sample with the arrangement according to the invention.

This procedure is repeated until a determined correction criterion is met. The step size $\Delta z_i$ can be adapted in a suitable manner. For example, FIG. 4 shows the above-described iteration process for imaging at a depth of 200 μm inside a biological specimen with a water immersion objective with NA=1.2 at a wavelength of 488 nm.

The difference in the index of refraction between the sample and the water immersion layer is 1.38−1.33=0.05, which leads as a condition of aberrations to a Strehl ratio of 0.06 (measured intensity divided by the intensity without any aberrations). After about sixty iterations of the type shown above, including the first and second order spherical aberration, the optimum of the correction is achieved which leads to a Strehl ratio of 0.92.

For more far-reaching corrections, additional Zernike terms must be included. In every iteration step, the gradients for the utilized coefficients are measured and influence the mirror geometry as was already stated.

When the optimization is begun with a previously estimated correction, there is a considerable acceleration of the iteration process. The optimum of the correction can also be achieved in less than 0.3 s at a working frequency of the mirror adjustment of 0.5 kHz with about sixty iterations.

Of course, the details of the iteration process can be modified in a simple manner. The description given above is only one embodiment variant of such a method. In principle, optimization methods of different types can be used.

In cases where the sample acts in a birefringent manner or its reflectivity depends extensively on the polarization, it is necessary to use identical settings for the adaptive mirrors 15 and 17. When the reception values of the converters 27.1 and 27.2 are added, the polarization-dependent effect of the sample is eliminated. Two measurements (with mirror position as described $(z_1, z_2, \ldots z_i \ldots z_N)$ and $(z_1, z_2, \ldots z_i + \Delta z_i/4 \ldots z_N))$ are now required for every coefficient in order to obtain a local gradient. At the same time, the difference of the reception signals can be used for polarization-sensitive measurements.

A special form of phase contrast is Differential Interference Contrast (DIC). This contrast method can be implemented in a simple manner with the arrangement according to the invention. In this case, the illumination light is divided between the adaptive mirrors 15 and 17 with equal intensity. The two adaptive mirrors are used for tilting the beam of one polarization relative to the beam of the other polarization. The separation of the illumination spots of the two beams and their orientation on the sample can be influenced directly by the adaptive mirrors 15 and 17. The beam paths are automatically corrected, i.e., made to coincide on the detector, in the detection beam path when passing the adaptive mirrors 15 and 17.

When using a polarizer with an axis inclined by 45° to the polarization direction of the two beams in front of the detector, there is interference of the two beams on the converters 27.1 and 27.2 which can be detected confocally or nonconfocally.

Fluorescence Microscopy

In this type of operation, the illumination light excites fluorescence in the sample which is used to generate images.

With respect to fluorescence excitation, particularly in biological samples, the polarization of the light is of secondary importance. Typically, the sample can be excited with linearly polarized light which comes, for example, from the adaptive mirror 15. The fluorescence radiation is generally unpolarized and is divided at the beam splitter 19.

The same procedure as that already described with reference to reflection microscopy can be used to obtain the gradients of the radiation intensity and accordingly the direction of the optimization of the mirror geometry with one measurement. The correction is carried out only on the detection side with different mirror settings, which is required for gradient determination because the excitation light passes over an adaptive element.

The image generation is carried out without losses with an identical optimized position of the mirrors 15 and 17; the signals of the converters 27.1 and 27.2 are added.

The following procedure can be implemented in order to carry out different corrections in the illumination beam path and in the detection beam path. The sample is again excited by linearly polarized light which, for example, comes from adaptive mirror 15. The signal received by the converter 27.2 can be used to optimize the mirror geometry of the adaptive mirror 17 independent from the reception signal of the converter 27.1 for optimizing the mirror shape of the adaptive mirror 15, wherein two measurements with a new mirror position are now required to determine a gradient.

The image generation is carried out with the mirror positions that have been optimized in this way, wherein the excitation light passes via mirror 15 and the detection light passes via mirror 17.

Figure 5:
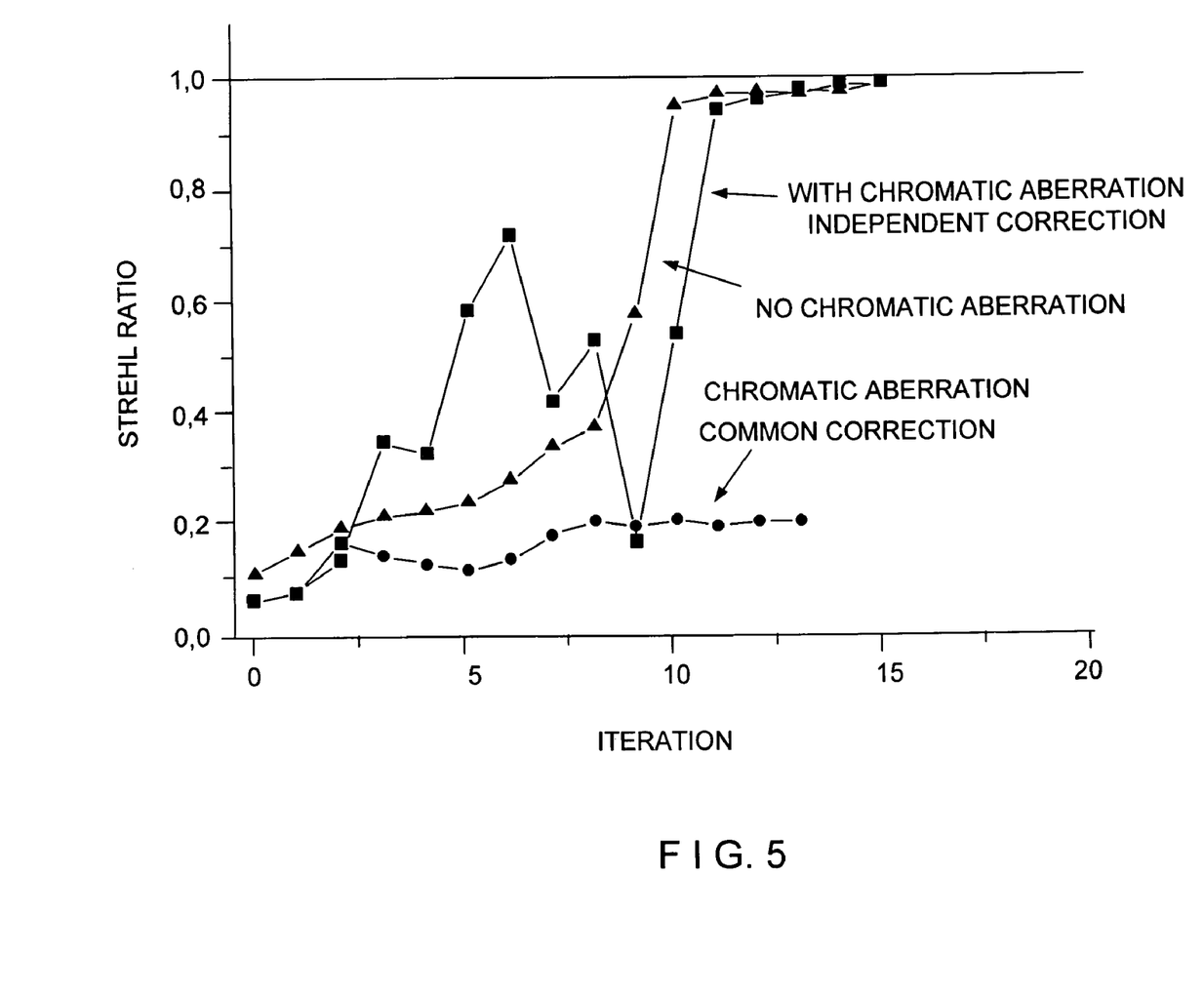
FIG. 5 shows an example of possibilities for correction during the imaging of a biological sample using the arrangement according to the invention.

FIG. 5 shows an example for the correction with imaging of a biological sample at a depth of 500 μm with a water immersion objective with an NA of 1.2. The excitation wavelength is 488 nm, the fluorescence wavelength is 550 nm. The deviation of the index of refraction of the sample from the index of refraction of the water immersion layer is 1.38−1.33=0.05 and leads to a Strehl ratio of 0.11 without chromatic aberration of the optical system. With chromatic aberration (primary longitudinal chromatic aberration of the focusing microscope objective) which corresponds to a change in focus of about 0.6 μm of the fluorescence radiation compared to the excitation radiation, the Strehl ratio continues to fall to about 0.06.

Without chromatic aberrations, the optimal correction is achieved within about 15 iterations, taking into account the first and second order spherical aberration. With chromatic aberration and optimal identical correction in the excitation beam path and fluorescence beam path, the optimized Strehl ratio is only 0.2. With an independent correction in the excitation beam path and fluorescence beam path which can be carried out with the present invention, a Strehl ratio of 0.99 can be achieved in spite of chromatic aberration.

Laser Microscopy with Nonlinear Excitation

With nonlinear excitation (multiphoton excited fluorescence, higher harmonics generation), a resolution equivalent to confocal detection is achieved without the use of a pinhole for detection. When a pinhole is used, the correction of image errors is required only in the illumination beam path.

Figure 2:
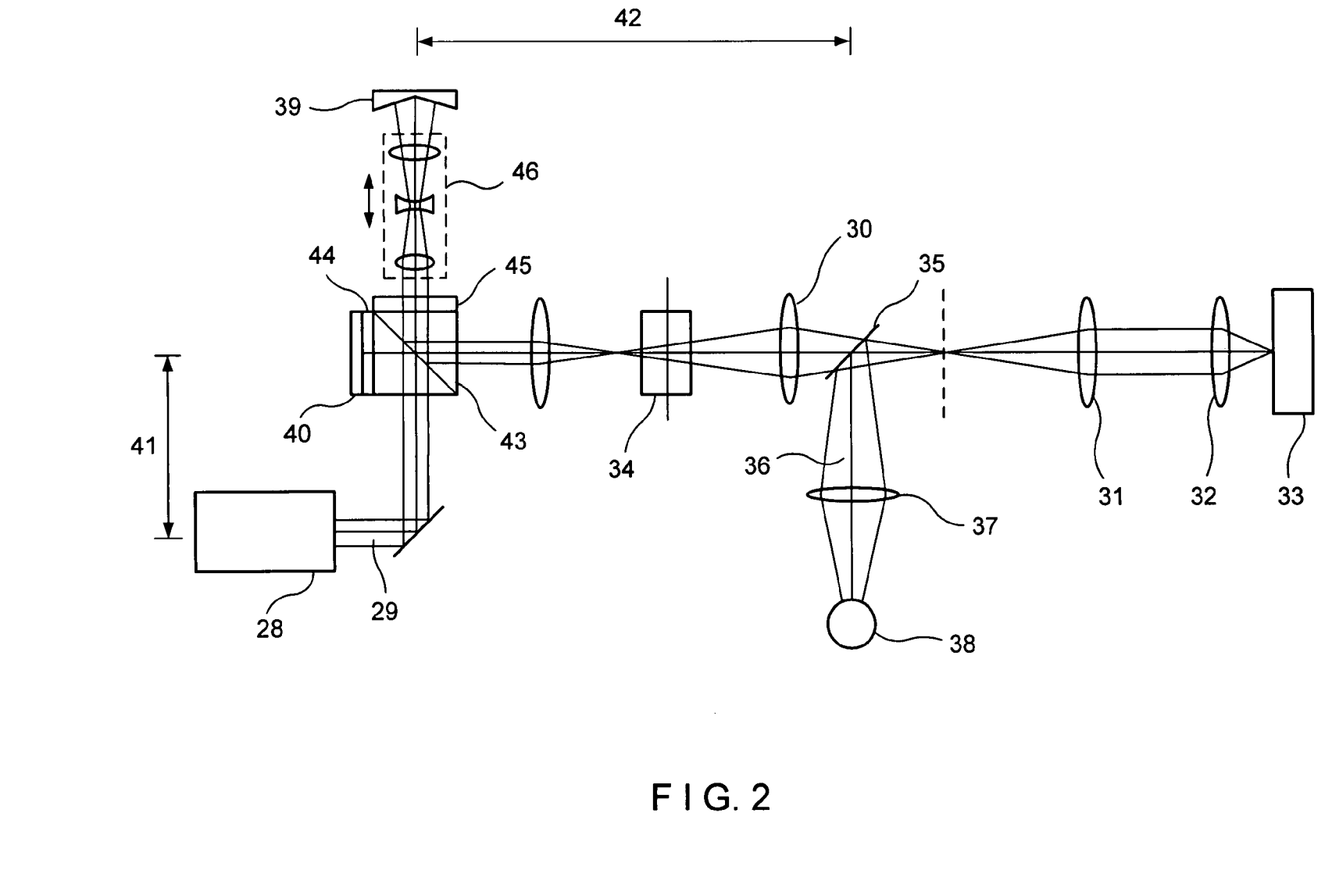
FIG. 2 shows a constructional variant of the beam path of a confocal laser scanning microscope with an adaptive optical device, according to the invention, comprising an adaptive mirror and a nonadaptive mirror.

In this case, the adaptive mirror 17 can be replaced by a nonadaptive mirror and a quarter-wave plate as was already mentioned with reference to FIG. 2. The reception signal of the detector 38 is then used directly to optimize the mirror geometry of the adaptive mirror 39 in the manner described above, wherein two measurements (mirror positions) are again required for determining a gradient.

When a pinhole is used to further increase resolution, the correction in the detection beam path is important and can be achieved in case of fluorescence, as was described above with respect to fluorescence microscopy and shown with reference to FIG. 1. In particular, an independent correction in the illumination beam path and detection beam path is possible in this way. Due to the typically large difference between the wavelengths of excitation radiation and fluorescence radiation, an independent correction of this kind is required to enable the use of a pinhole.

An advantage of the iterative regulation of the adaptive optics which is described herein consists in that the actual wavefront forming by the adaptive elements need not be known exactly, since signal optimization is achieved iteratively by means of a variation process. Due to the necessity of passing through different adaptive positions (iterations) per optimization, care must be taken that movements of the sample, bleaching or damage to the sample can not occur during optimization. Bleaching of or damage to the sample can be minimized by reducing the intensity of the illumination radiation because the detection sensitivity used in the solution according to the invention for the adaptive correction is the same as that used as for obtaining images.

During the iterative process for the adaptive correction, the increasing improvement in the reception signal allows a further reduction in the illumination intensity. A suitably selected initial position of the adaptive element makes it possible to reduce the quantity of iterations during the process and consequently to introduce less energy into the sample.

For the optimization itself, the above-mentioned processes play a subordinate role because a gradient is determined with respect to the actual state of the sample in each instance and is used to control the optimization process.

Relative movements of the sample and optical system can also be corrected when a small but structured portion of the sample is scanned during optimization. The image information can be used for correcting the movement of the sample (e.g., through cross-correlation).

The movement correction is achieved by means of the adaptive mirrors by defocusing by a suitable amount and/or by means of the scanning device 7 or 34 of the microscope arrangement. The possibility of correcting fast movements of the sample is another possible application of the adaptive optics for image acquisition in general. The electronic analysis of successive images (e.g., for purposes of improving contrast at high frequencies) is another option for judging the correction process by means of the adaptive mirrors.

While the foregoing description and drawings represent the present invention, it will be obvious to those skilled in the art that various changes may be made therein without departing from the true spirit and scope of the present invention.

| Reference Numbers | |
|---|---|
| 1 | illumination source |
| 2 | illumination light |

-continued

| Reference Numbers | |
|---|---|
| 3 | sample |
| 4 | scanning optics |
| 5 | tube lens |
| 6 | microscope objective |
| 7 | scanning device |
| 8 | beam splitter |
| 9 | detection beam path |
| 10 | detection device |
| 11 | pinhole optics |
| 12 | pinhole |
| 13 | collimating optics |
| 14 | wavelength filter |
| 15 | adaptive mirror |
| 16 | arm |
| 17 | adaptive mirror |
| 18 | arm |
| 19 | beam splitter |
| 20 | quarter-wave plate |
| 21 | zoom optics |
| 22 | quarter-wave plate |
| 23 | zoom optics |
| 24 | lens |
| 25 | pupil plane |
| 26 | beam splitter |
| 27.1, 27.2 | converters |
| 28 | illumination source |
| 29 | illumination light |
| 30 | scanning optics |
| 31 | tube lens |
| 32 | microscope objective |
| 33 | sample |
| 34 | scanning device |
| 35 | beam splitter |
| 36 | detection beam path |
| 37 | pinhole optics |
| 38 | detector |
| 39 | adaptive mirror |
| 40 | nonadaptive mirror |
| 41, 42 | arm |
| 43 | beam splitter |
| 44, 45 | quarter-wave plate |
| 46 | zoom optics |
| 48 | illumination source |
| 49 | illumination light |
| 49.1 | beam component |
| 50 | splitter surface |
| 51 | transmittive area |
| 52 | reflective area |
| 53 | concave mirror |
| 54 | lens |
| 55 | scanning optics |
| 56 | tube lens |
| 57 | microscope objective |
| 58 | sample |
| 59 | scanning device |
| 60 | beam splitter |
| 61 | detection beam path |
| 61.1 | beam component |
| 62 | splitter surface |
| 63 | concave mirror |
| 64, 65 | detector |
| 66 | wavelength filter |
| 67 | relay optics |

What is claimed is:

1. A laser scanning microscope, with an adaptive optical device in the microscope beam path, comprising:

two adaptive reflective elements, at least one of which is constructed as an adaptive optical element, both of which being oriented with their reflector surface vertical to the optical axes of the microscope beam path, each adaptive reflective element having a reflective surface with a geometry that is changed by a control;

a polarizing beam splitter having a splitter layer which is located in the vertex of two orthogonal arms of the microscope beam path or two orthogonal portions of a folded microscope beam path, wherein a first adaptive element is associated with one arm and the other adaptive element is associated with a second arm, and a quarter-wave plate being located in each arm between the beam splitter and adaptive reflective element; and a detection device to which the detection light is directed and which is linked to the adaptive elements by evaluating and adjusting devices; and wherein the detection light coming from the sample is reflected by at least one of the adaptive elements.

2. The laser scanning microscope according to claim 1;
wherein, in one arm, the light coming from the illumination source, depending on its polarization state:

passes through the splitter layer and a quarter-wave plate to a first adaptive element, is then reflected back by the reflector surface of the adaptive element to the splitter layer and is deflected to the microscope objective; and/or is deflected in the direction of a second adaptive element and, after passing through a quarter-wave plate, strikes the second adaptive element, is reflected back by the latter to the splitter layer and passes through the latter to the microscope objective;

wherein, in the other arm, the detection light coming from a sample through the microscope objective, depending on its polarization state:

passes through the splitter layer and a quarter-wave plate to the second adaptive element, is then reflected back by the reflector surface of the latter to the splitter layer and is deflected to the detection device; and/or is deflected by the splitter layer in the direction of the first adaptive element and, after passing through a quarter-wave plate, strikes the first adaptive element, is reflected back by the latter to the splitter layer and passes through the latter to the detection device; and wherein the detection device has a second polarizing beam splitter and two optoelectronic converters which are coupled with the adaptive elements by an evaluating and adjusting device, wherein, depending on its polarization state, the detection light passes through the beam splitter to the one optoelectronic converter or is deflected by the splitter layer to the other optoelectronic converter.

3. The laser scanning microscope according to claim 1;
wherein pinhole optics for focusing the detection light on a pinhole and a lens for collimating the detection light are provided between the beam splitter and the detection device.

4. A laser scanning microscope, with an adaptive optical device in the microscope beam path, comprising:

an adaptive reflective element and a nonadaptive reflective element, both of which being oriented with their reflector surface vertical to the optical axis of the microscope beam path, the adaptive reflective element having a reflective surface with a geometry that is changed by a control;

a polarizing beam splitter having a splitter layer located in the vertex of two orthogonal arms of the microscope beam path or two orthogonal portions of a microscope beam path which is folded multiple times, wherein the adaptive element is associated with one arm and the nonadaptive element is associated with a second arm, and a quarter-wave plate being located in each arm between the beam splitter and the respective reflective element; and a detection device to which the detection light is directed and which is linked to the adaptive element via an evaluating and adjusting device.

5. The laser scanning microscope according to claim 4;
wherein, in one arm the light coming from the illumination source, depending on its polarization state:
passes through the splitter layer and a quarter-wave plate to the adaptive element, is reflected back to the splitter layer by the reflector surface of the adaptive element and is deflected by the splitter layer toward the microscope objective; and/or
is deflected by the splitter layer in the direction of the reflective element, is reflected back to the splitter layer by the reflective element after passing through a quarter-wave plate, and passes through the splitter layer to arrive at the microscope objective;
wherein, in the other arm, the light coming from a sample through the microscope objective, depending on its polarization state:
passes through the splitter layer and a quarter-wave plate to the reflective element, is reflected back by the latter to the splitter layer and arrives at the detection device; and/or
is deflected by the splitter layer in the direction of the adaptive element and, after passing through a quarter-wave plate, is reflected back by the adaptive element to the splitter layer and arrives at the detection device.

6. The laser scanning microscope according to claim 4;
wherein each adaptive element is positioned in a pupil plane of the microscope beam path, and optics are provided in the beam path between the beam splitter and the microscope objective for imaging the plane of the adaptive elements in a pupil plane of the microscope arrangement.

7. The laser scanning microscope according to claim 6;
wherein the pupil plane is identical to the reflecting surface of the scanning device and the scanning optics, the microscope objective and a tube lens are positioned relative to one another in such a way that a diffraction-limited spot is generated in the sample, which spot is guided over the sample in lateral direction due to the scanning movement.

8. The laser scanning microscope according to claim 4;
wherein mirrors with mirror surfaces that are adjustable in segments, diaphragm mirrors or reflective spatial light modulators are provided as adaptive elements.

9. The laser scanning microscope according to claim 4;
wherein zoom optics are associated with at least one of the adaptive elements and serve to adapt the aperture of this adaptive element to the aperture of the microscope objective.

10. A laser scanning microscope, with an adaptive optical device, comprising:
an adaptive concave mirror which is arranged in a pupil plane of the illumination beam path, an optical beam splitter being associated with the adaptive concave mirror in an intermediate image plane and having a transmittive area and a reflective area in a splitter surface, wherein the illumination light is directed initially to the splitter surface and from the reflective area of the latter to the concave mirror, is focused by the concave mirror onto the transmittive area and passes through the latter to the sample, the adaptive concave mirror having a mirror surface with a geometry that is changed by a control; and/or
an adaptive concave mirror which is arranged in a pupil plane of the detection beam path, an optical beam splitter being associated with the adaptive concave mirror in an intermediate image plane and having a transmittive area and a reflective area in a splitter surface, wherein the detection light is directed initially to the splitter surface and from its reflective area to the concave mirror, is focused by the concave mirror onto the transmittive area and passes through the latter to a detection device, the adaptive concave mirror having a mirror surface with a geometry that is changed by a control; and
evaluating and adjusting devices which are connected to the adaptive element in the illumination beam path and/or to the adaptive element in the detection beam path, wherein the output signals of the detection device are used for adaptive regulation of the wavefront of the illumination light or detection light.

11. The laser scanning microscope according to claim 10;
wherein the detection light coming from the sample is branched off from the microscope beam path by a beam splitter which is provided for this purpose in the microscope beam path.

12. The laser scanning microscope according to claim 11;
wherein a detector is arranged downstream of the light coming from the illumination source and/or the detection light coming from the sample, and the beam component falling through the transmittive area impinges on said detector.

13. The laser scanning microscope according to claim 11;
wherein the adaptive element is coupled with a device for displacement in the direction of the optical axis, said device likewise being connected to the evaluating and adjusting devices, wherein the beam expansion of the illumination light is influenced by the displacement of the adaptive concave mirror as well as by the change in the focal length of the concave mirror surface.

14. The laser scanning microscope according to claim 10;
wherein a point-scanning device is provided for scanning the sample, and the transmittive areas of the splitter surface are formed as circular or elliptical openings.

15. The laser scanning microscope according to claim 14;
wherein the splitter surface is inclined by 45° relative to the incident radiation.

16. A laser scanning microscope according to claim 10;
wherein a line-scanning device is provided for scanning the sample, and the transmittive areas of the splitter surface are formed as slit-shaped openings.

17. The laser scanning microscope according to claim 10;
wherein information about the intensity of the received light signal is available at the outputs of the detection devices, said information is compared in the evaluating unit to information stored therein, an actuating signal is generated from the determined difference of the information about the intensity of the received light signal at the outputs of the detection devices and the information stored in the evaluating unit, and said actuating signal is used to reposition the reflector surfaces of the adaptive elements.

18. The laser scanning microscope according to claim 17;
wherein the information stored in the evaluating device is obtained from simultaneous or previous detection with a defined other position of the adaptive elements.

* * * * *